(12) United States Patent
Cech et al.

(10) Patent No.: US 8,908,206 B2
(45) Date of Patent: Dec. 9, 2014

(54) AUTOMATED PRINT JOB MODIFICATION FOR REDUCED TOTAL AND COLOR PAGE COUNTS

(75) Inventors: Peter V. Cech, Pittsford, NY (US); Matthew O. Scrafford, Fairport, NY (US); Jason C. Tsongas, Rochester, NY (US); Matthew J. Lombardo, Rochester, NY (US); Daniel K. Rupe, Fairport, NY (US); Bijender S. Malik, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 533 days.

(21) Appl. No.: 13/048,328

(22) Filed: Mar. 15, 2011

(65) Prior Publication Data

US 2012/0236357 A1    Sep. 20, 2012

(51) Int. Cl.
*G06F 3/12* (2006.01)

(52) U.S. Cl.
CPC ............ *G06F 3/1219* (2013.01); *G06F 3/125* (2013.01); *G06F 3/1254* (2013.01); *G06F 3/1288* (2013.01); *G06F 3/1204* (2013.01); *G06F 3/1208* (2013.01)
USPC ......... 358/1.15; 358/1.13; 358/1.18; 358/1.2; 382/100

(58) Field of Classification Search
CPC ... G06F 3/1204; G06F 3/1208; G06F 3/1219; G06F 3/125; G06F 3/1254; G06F 3/1206; G06F 3/1218; G06F 3/1225; G06F 3/1258; G06F 3/1285
USPC ........ 358/1.13, 1.15, 1.18, 1.2, 1.12; 382/100
See application file for complete search history.

(56) References Cited

U.S. PATENT DOCUMENTS

| 6,559,971 | B1 | 5/2003 | Watts et al. | |
|---|---|---|---|---|
| 6,738,151 | B1* | 5/2004 | Kato | 358/1.12 |
| 7,249,319 | B1 | 7/2007 | Payne et al. | |
| 8,009,303 | B2* | 8/2011 | Kujirai et al. | 358/1.13 |
| 2007/0201053 | A1 | 8/2007 | Sellers et al. | |
| 2009/0109464 | A1* | 4/2009 | Knodt | 358/1.15 |
| 2009/0141930 | A1* | 6/2009 | Kiwada | 382/100 |
| 2010/0177348 | A1* | 7/2010 | Yamada | 358/1.15 |
| 2010/0238498 | A1* | 9/2010 | Okada et al. | 358/1.15 |
| 2011/0075219 | A1* | 3/2011 | Sakurai | 358/1.18 |
| 2012/0206748 | A1* | 8/2012 | Hines et al. | 358/1.13 |

* cited by examiner

*Primary Examiner* — Benny Q Tieu
*Assistant Examiner* — Juan M Guillermety
(74) *Attorney, Agent, or Firm* — Fay Sharpe LLP

(57) ABSTRACT

Systems and methods for reducing total and/or color page counts are provided. The systems include a memory, including a print queue, and one or more processors. The processors are programmed to receive a print job. The print job includes a document formatted according to a page description language (PDL). The processors are further programmed to apply one or more formatting fixes to the document and transfer the print job to the print queue. The formatting fixes include at least one of image fitting, text fitting and table fitting.

18 Claims, 4 Drawing Sheets

AUTOMATED PRINT JOB MODIFICATION FOR REDUCED TOTAL AND COLOR PAGE COUNTS

BACKGROUND

The present disclosure relates generally to printing. It finds particular application in conjunction with reducing page counts for print jobs, and will be described with particular reference thereto. However, it is to be appreciated that the present exemplary embodiments are also amenable to other like applications.

When one prints a document, often times the output is poorly formatted. For example, images wrapping across multiple pages, segmented tables, and sparsely populated pages. Typically, documents yield a poor output because of carelessness and/or lack of proficiency in formatting documents and/or manipulating print technology. However, regardless of the reason, printing poorly formatted documents leads to an increase in printed pages and cost, partially because poorly formatted documents tend to be longer and partially because of reprints. Even more, poorly formatted documents impose a burden upon those who print them. Such individuals must choose between remaining with the marginal output of their documents or manually adjusting and reprinting them.

The present disclosure provides a new and improved system and method which overcome the above-referenced problems and others.

BRIEF DESCRIPTION

In accordance with one aspect of the present disclosure, a system for reducing total and/or color page counts is provided. The system includes a memory, including a print queue, and one or more processors. The processors are programmed to receive a print job. The print job includes a document formatted according to a page description language (PDL). The processors are further programmed to apply one or more formatting fixes to the document and transfer the print job to the print queue. The formatting fixes include at least one of image fitting, text fitting and table fitting.

In accordance with another aspect of the present disclosure, a method for reducing total and/or color page counts is provided. A print job is received. The print job includes a document formatted according to a page description language (PDL). One or more formatting fixes are applied to the document and the print job is transferred to a print queue. The formatting fixes including at least one of image fitting, text fitting and table fitting

DETAILED DESCRIPTION

Figure 1:
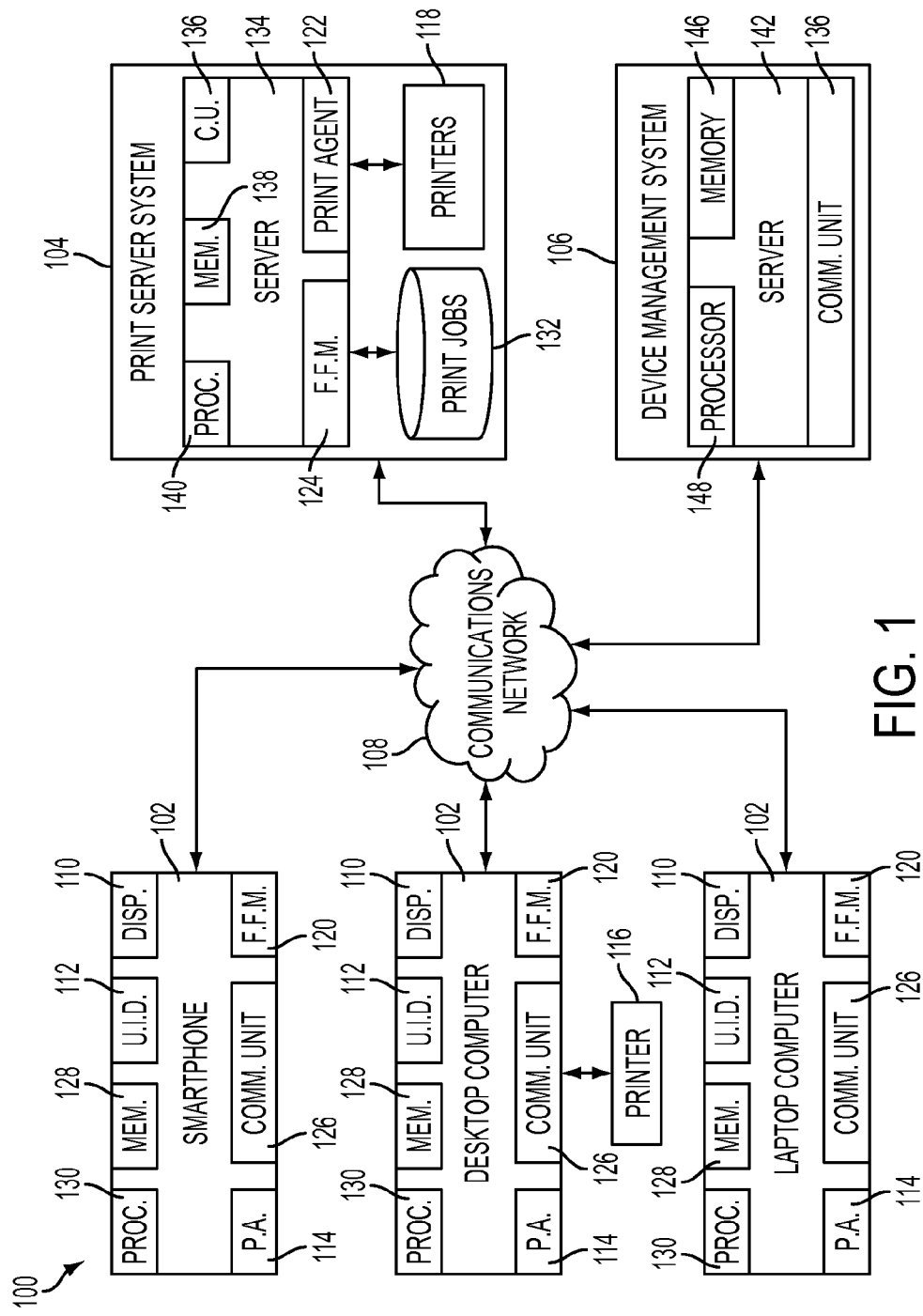
FIG. 1 is a block diagram of an IT infrastructure.

With reference to FIG. 1, an information technology (IT) infrastructure 100 for an institution is provided. It is contemplated that the institution is one of a business institution, an academic institution, a government institution, and the like. The IT infrastructure 100 includes one or more user devices 102, a print server system 104, a device management system 106, and the like. Suitably, the components of the IT infrastructure 100 are interconnected via a communications network 108, such as the Internet, a local area network, a wide area network, a wireless network, or the like.

The user devices 102 allow associated users to read and/or write documents within the IT infrastructure 100, optionally via the communications network 108. It is contemplated that these documents are stored local to the user devices 102 and/or on a remote component of the IT infrastructure 100, such as a document management system. In certain embodiments, graphical user interfaces presented to the users via displays 110 of the user devices 102 are employed to facilitate read and/or write operations. In such embodiments, user input devices 112 of the user devices 102 allow the users to manipulate documents via the graphical user interfaces.

In addition to reading and/or writing documents, the user devices 102 further allow the associated users to print documents using print agents 114 thereof. The print agents 114 send print jobs for documents to local printers 116 of the user devices 102 and/or remote printers 118 of the print server system 104. Suitably, print jobs are sent to the local printers 116 by way a data bus, such as a USB data bus, and print jobs are sent to the remote printers 118 by way of the communications network 108. The printers 116, 118, local or remote, are suitably at least one of a laser printer, an inkjet printer, a dot-matrix printer, and so on capable of printing color and/or black and white.

When sending a print job to one of the local printers 116, the relevant print agent spools the print job to a print queue for the local printer. Further, if the print job is not already in a page description language (PDL) supported by the printer, the print agent converts the print job to a PDL supported by the printer. PDLs include, but are not limited to, PostScript, printer command language (PCL), and so on.

In certain instances, format fixing modules 120 of the user devices 102 modify spooled print jobs so as to reduce the number of overall pages and/or color pages printed. In that regard, it is contemplated that the format fixing modules 120 intercept print jobs destined for print queues and/or modify print jobs in print queues, through coordination with the print agents 114. Insofar as a print job is intercepted en route to a print queue, the print job is modified and transferred to the print queue after modification thereof. Insofar as a print job in a print queue is modified from a print queue, the print job is implicitly or explicitly removed from the print queue, modified and returned to the print queue.

Modifications applied to spooled print jobs are typically dependent upon the configurations of the format fixing modules 120. Suitably, the configurations of the format fixing modules 120 are maintained by the device management system 106, whereby the user devices 102 typically receive the configurations by way of the communications network 108. However, it is contemplated that the configurations are maintained local to the user devices 102 and/or by other components of the IT infrastructure 100. Further, it is also contemplated that a configuration of at least one of the format fixing modules 120 is a hybrid of a local configuration and a remote configuration, where a prioritization or other scheme can, optionally, be employed to resolve conflicts between the two configurations.

To modify a spooled print job, one or more formatting fixes are applied to PDL thereof representing the document of the print job. A formatting fix resizes and/or repositions a component of the document, such as a table, text, an image, and so on, and/or modifies attributes of the document, such as font size, margin size, and so, to reduce overall page counts and/or color page counts. Advantageously, because the formatting fixes are applied to a document formatted in a PDL, the fixes can be applied to any document printed, regardless of the document type. Suitably, the formatting fixes include at least one of image fitting, text fitting and table fitting.

With image fitting, images that wrap across multiple pages of a document are scaled and/or repositioned to fit within page margins. Suitably, image fitting includes analysis of the document to identify images that wrap across multiple pages. For each of the identified images, a determination is made as whether and, if appropriate, how the identified image can be resized and/or repositioned to reduce the total number of pages and/or the number of color pages. In certain embodiments, the determination takes into account the relative importance of reducing total page counts and the number of color pages. Additionally or alternatively, in certain embodiments, the determination is made subject to limits on the extent of an image resize and/or image shift. Suitably, said limits are defined by the configuration of the format fixing module. Insofar as an image can be resized and/or repositioned based on the determination, the image is so resized and/or repositioned.

Figure 2:
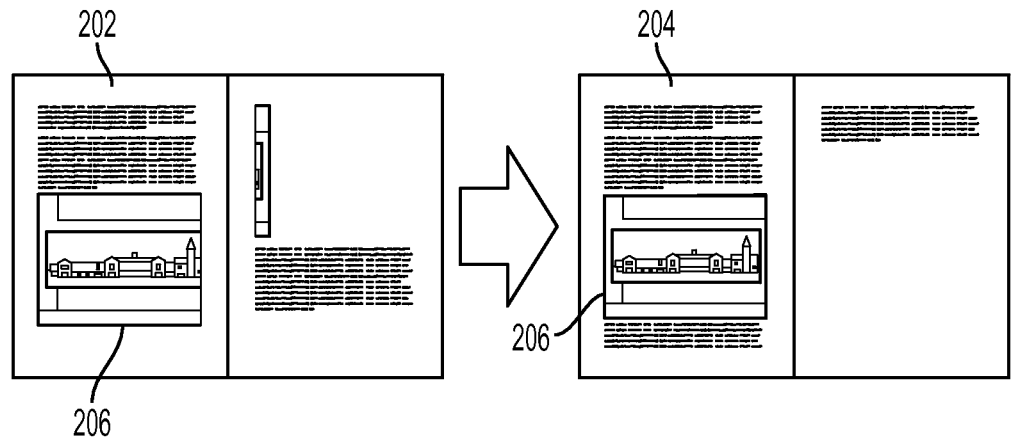
FIG. 2 is an illustration of image fitting.

With reference to FIG. 2, a document before 202 and after 204 image fitting is illustrated. A color image 206 of the document 202, 204 originally wrapped across two pages, whereby the document 202, 204 originally required two color pages to print. However, through application of image fitting, the image 206 was modified to span a single page, whereby the document 202, 204 only requires a single color page to print.

With table fitting, tables which span multiple pages of a document are repositioned to minimize the number of pages they span and reduce segmentation. For example, a table split across two pages proximate to its heading is pushed to the next page. Advantageously, this reduces table segmentation. Table fitting includes analysis of the document to identify tables that span multiple pages. For each of the identified tables, a determination as whether and, if appropriate, how the identified table can be repositioned to reduce the total number pages and/or the number of color pages. As above, in certain embodiments, the determination takes into account the relative importance of reducing total page counts and the number of color pages. Additionally or alternatively, in certain embodiments, the determination is made subject to limits on the extent of table shift. Suitably, said limits are defined by the configuration of the format fixing module. Insofar as a table can be repositioned based on the determination, the table is so repositioned.

Figure 3:
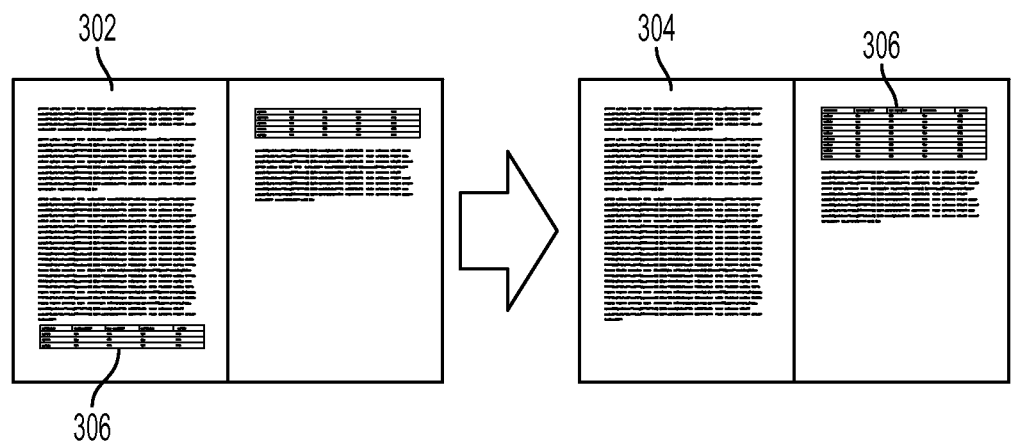
FIG. 3 is an illustration of table fitting.

With reference to FIG. 3, a document before 302 and after 304 table fitting is illustrated. A color table 306 of the document 302, 304 originally spanned two pages. However, through application of table fitting, the table 306 is pushed from the bottom of one page to the top of another. Advantageously, by doing this, the table 306 is much easier to view and appears all on one page. Further, it allows for the color page count to be reduced from two to one page.

With text fitting, margins and/or font sizes are minimally modified to compress the text body. For example, a margin adjustment of +0.1 to +0.3 or a font size adjust to range in 11, 10, or 9 pt. Texting fitting includes determining whether the document includes a page sparsely populated with text. Insofar as the document includes such a page, a determination is made as to whether and, if appropriate, how the margins and/or font sizes of the document can be adjusted to reduce the total number pages and/or the number of color pages. As above, in certain embodiments, the determination takes into account the relative importance of reducing total page counts and the number of color pages. Additionally or alternatively, in certain embodiments, the determination is made subject to limits on the extent of font resizing and/or margin adjustment. Suitably, said limits are defined by the configuration of the format fixing module. Insofar as the page can be eliminated, the fonts and/or margins of the document are resized.

Figure 4:
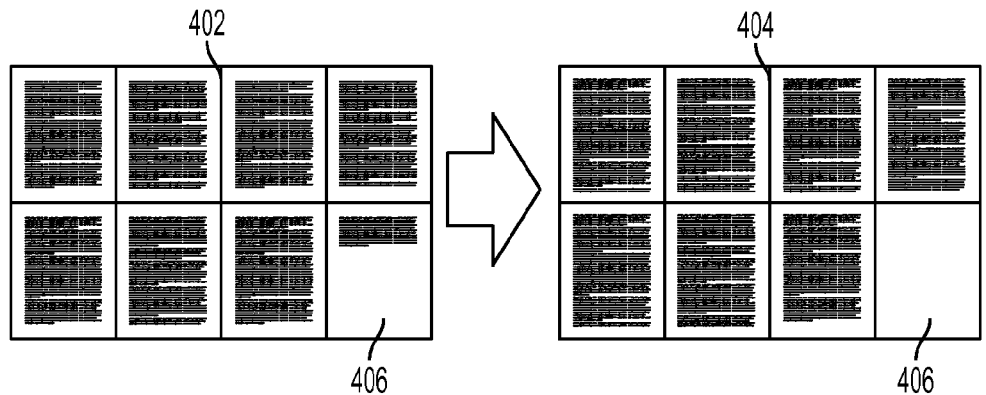
FIG. 4 is an illustration of text fitting.

With reference to FIG. 4, a document before 402 and after 404 text fitting is illustrated. Notably, the document includes a page 406 sparsely populated with text. The text would have normally spanned eight pages. However, through application of text fitting, the total page count is reduced to seven pages.

In certain embodiments, at least one of the format fixing modules 120 is configured to automatically apply one or more of the formatting fixes to a print job. Additionally or alternatively, in certain embodiments, at least one of the format fixing modules 120 is configured to prompt a user for selection of which of at least one of the formatting fixes to apply to a print job and/or for modifications of configuration parameters of the formatting fixes. Suitably, but not necessarily, the prompt is only presented to the user if, after analyzing the document, it is determined that a page savings, in either total or color pages, can be made by changing the formatting within the PDL. Further, suitably only those formatting fixes that would result in an enhancement are displayed and/or enabled on the prompt. Beyond prompting a user for selection for formatting fixes and/or modifications of configuration parameters, it is contemplated that the prompt can also display an estimated cost for the print job and/or an explanation of recommended formatting fixes. Suitably, such a prompt is presented to the user by way of the relevant one of the displays 110, where the user input devices associated with the display are used to interact with the prompt.

Figure 5:
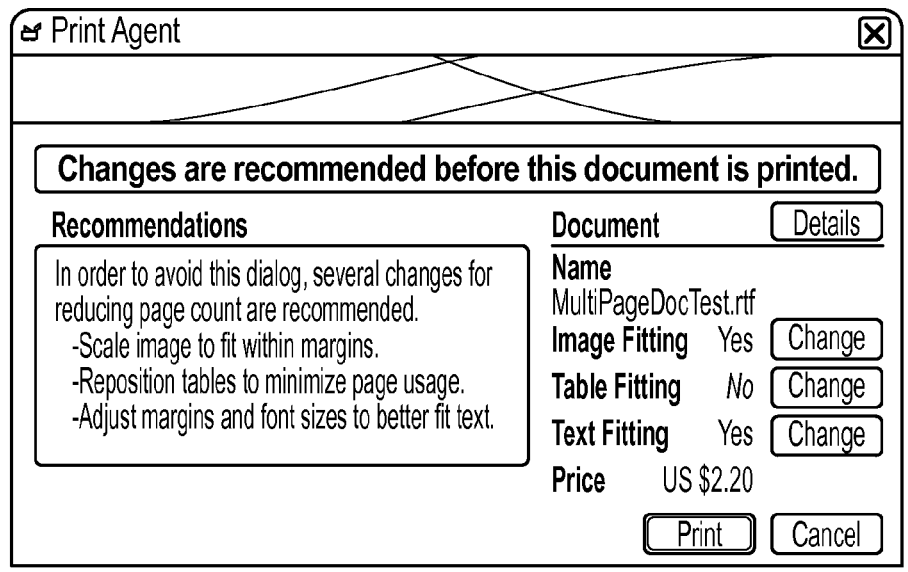
FIG. 5 is an embodiment of a prompt presented by a format fixing module.

With reference to FIG. 5, an embodiment of the prompt is illustrated. The prompt allows the user to print a print job in its current state or to enable various formatting fixes. As to the latter, each of the formatting fixes includes a user modifiable yes/no attribute next to it indicating whether a particular formatting fix is enabled or disabled. Enabling or disabling a formatting fix consequently shows the change in a price attribute of the document. When the user receives the prompt and starts enabling the various formatting fixes, they typically see the price go up or down.

When sending a print job to a remote printer, the relevant print agent of the user devices 102 sends the print job to the print server system 104, which spools the print job to a print queue for the remote printer using print agents 122 of the print server system 104. Further, if the document is not already in a page description language (PDL) supported by the remote printer, the print agents 122 of the print server system 104 convert the document to a PDL supported by the printer. PDLs include, but are not limited to, PostScript, printer command language (PCL), and so on.

In certain instances, format fixing modules 124 of the print server system 104 modify spooled print jobs so as to reduce the number of overall pages and/or color pages printed, as discussed above. In that regard, it is contemplated that the format fixing modules 124 intercept print jobs destined for print queues and/or modify print jobs in print queues, through coordination with the print agents 122. Insofar as a print job is intercepted en route to a print queue, the print job is modified and transferred to the print queue after modification thereof. Insofar as a print job in a print queue is modified from a print queue, the print job is implicitly or explicitly removed from the print queue, modified and returned to the print queue.

Figure 6:
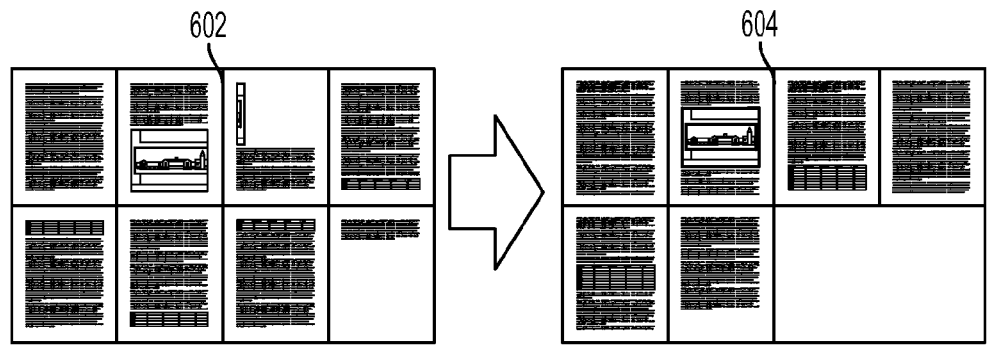
FIG. 6 is an illustration of a format fixing using image fitting, table fitting and text fitting; and, FIG. 7 is a block diagram of a method for reducing total and/or color page counts.

With reference to FIG. 6, the cumulative effect of all three formatting fixes is illustrated. An original document 602 is shown next to a fixed version 604 of the document in which the formatting fixes have been applied. The formatting fixes have transformed the document from appearing disorganized and lengthy to one that is visually appealing and compact. The total page count is reduced by two and the number of color pages is reduced from six to three. This does not only result in a better overall formatted document, but also the overall cost of the total document is reduced to half.

The user devices 102 are digital processing devices, such as computers, smart phones, personal digital assistants, and the like, executing software to carry out the above noted functions. That is to say, the user devices 102 are digital processing devices executing software to allow users associated with the user devices 102 to read and/or write documents and print documents. For example, it is contemplated that a word processing program, such as MICROSOFT WORD, executing on the user devices 102 facilitates the reading and/or writing of documents.

Each of the user devices 102 suitably includes a communications unit 126, a memory 128, one of the print agent 114, one of the format fixing modules 120, one of the displays 110, at least one of the user input devices 112, a processor 130, and the like. The communications units 126 allow the user devices 102 to interact with other components of the IT infrastructure 100, such as the print server system 104 and/or the local printers 116. The memories 128 include computer executable instructions for performing the above noted functions associated with the user devices 102, such as reading and/or writing documents. The print agents 114 and the format fixing modules 120 are suitably embodied by computer executable instructions on the memories 128. The displays 110 display the graphical user interfaces facilitating user interaction with the user devices 102. The user input devices 112 allow users to interact with the graphical user interfaces. The processors 130 execute the computer executable instructions on the memories 128.

The print server system 104 controls one or more printers 118 of the print server system 104 to print documents in accordance with print jobs received from the communications network 108. As noted above, the printers 118 are suitably at least one of a laser printer, an inkjet printer, a dot-matrix printer, and so on capable of printing color and/or black and white. Although centrally illustrated, it is to be understood that the print server system 104 is suitably distributed through the IT infrastructure 100.

To facilitate printing, each of the printers 118 of the printer server system 104 includes a print queue in a print jobs database 130 of the print server system 104. When a print job is received from the communications network 108, print agents 122 of the print server system 104 spool the print job to the print queue for the printer to which the print job is directed. Further, if the print job is not already in a page description language (PDL) supported by the printer, the print agents 122 convert the print job to a PDL supported by the printer. PDLs include, but are not limited to, PostScript, printer command language (PCL), and so on.

In certain instances, the format fixing modules 124 of the print server system 104 modify spooled print jobs so as to reduce the number of overall pages and/or color pages printed, as discussed above. In that regard, it is contemplated that the format fixing modules 124 intercept print jobs destined for print queues and/or modify print jobs in print queues, through coordination with the print agents 122. Insofar as a print job is intercepted en route to a print queue, the print job is modified and transferred to the print queue after modification thereof. Insofar as a print job in a print queue is modified from a print queue, the print job is implicitly or explicitly removed from the print queue, modified and returned to the print queue.

Suitably, the format fixing modules 124 are configured to automatically apply one or more of the formatting fixes to print jobs and/or configured to prompt a user for selection of which of at least one of the formatting fixes to apply to print jobs. As to the latter, the format fixing modules 124 prompt the users of the user devices 102 by way of the communications network 108. For example, the format fixing modules 124 coordinate with the user devices 102 to display the prompt on the displays 110 of the user devices 102 and receive user input from the user input devices 112 of the user devices 102, via the communications network 108.

The print server system 104 suitably includes one or more servers 134 facilitating printing via the communications network 108. Further, each of the servers 134 typically includes a communications unit 136, a memory 138, a processor 140, one of the print agents 122, one of the format fixing modules 124, and the like. The communications units 136 provide the servers 134 with interfaces from which to interact with the print jobs database 132 and/or each other 134, optionally via the communications network 108. The communications units 136 further allow the servers 134 to interact with other components of the IT infrastructure 100, such as the user devices 102, via the communications network 108. The memories 138 include computer executable instructions for performing the above noted functions associated with the servers 134. Typically, the print agents 122 and the format fixing modules 124 are embodied by computer executable instructions on the memories 138. The processors 140 execute the computer executable instructions on the memories 138 to perform the above noted functions.

The device management system 106 is a central repository of configuration parameters for components of the IT infrastructure 100, such as the user devices 102 and the printer server system 104. For example, the device management system 106 can provide configuration parameters as to what types of documents, such as HTML documents, the user devices 102 can print, which formatting fixes can be applied by users, whether formatting fixes must be applied, the extent of formatting fixes, and so on. In certain embodiments, the device management system 106 allows configuration parameters to be defined based on match criteria, including user device type, document type (HTML, DOCX, etc.; color and/or black and white; and so on), destination printer, and so on. For example, all colored print jobs must employ the formatting fixes. Suitably, the configurations are distributed to the components by way of the communications network 108. Further, administrators of the IT infrastructure 100 suitably maintain the device management system 106.

The device management system 106 suitably includes one or more servers 142 facilitating printing via the communications network 108. Further, each of the servers 142 typically includes a communications unit 144, a memory 146, a processor 148, and the like. The communications units 144 allow the servers 142 to interact with other components of the IT infrastructure 100, such as the user devices 102, via the communications network 108. The memories 146 include computer executable instructions for performing the above noted functions associated with the servers 142. The processors 148 execute the computer executable instructions on the memories 146 to perform the above noted functions.

Figure 7:
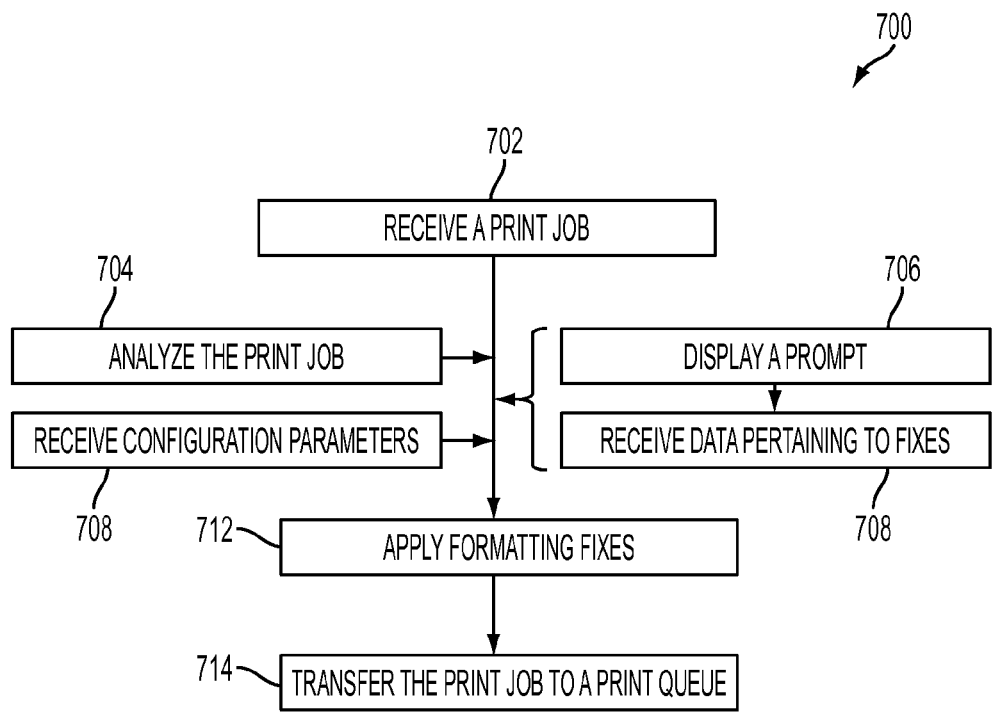

With reference to FIG. 7, a block diagram of a method 700 for reducing total and/or color page counts is provided. One of the user devices 102 and/or the printer server system 104 suitably carries out the method. However, other components of the IT infrastructure 100 can perform the method 700. To begin, a print job is received 702 from, for example, a print queue, a print agent, a component of the IT infrastructure 100, and so on. In certain embodiments, where the print job is received from a print agent, it is suitably received by intercepting the print job en route to a print queue. The print job suitably includes a document formatted according to a page description language (PDL), such as PCL and PostScript.

In certain embodiments, after receiving 702 the print job, the print job is analyzed 704 to determine the formatting fixes to apply to the document. Based thereon, the determined formatting fixes can be, for example, automatically applied, used to determine whether to prompt a user for selection of the formatting fixes to apply, as described below, or employed to provide a user with recommendations as to the formatting fixes to apply to the print job. Such formatting fixes are suitably provided to the user by way of a prompt, described hereafter.

Additionally or alternatively, in certain embodiments, after receiving 702 the print job, a prompt requesting input as to formatting fixes to apply to the document can be displayed 706 to the user printing the document. Whether the prompt is displayed can be based on whether there are any applicable formatting fixes. The prompt can include an estimated cost for the print job and/or recommendations as to formatting fixes to apply. From the prompt, data indicative of the formatting fixes to apply to the document are suitably received 708. Where one of the user devices 102 performs the method 700, the prompt is suitably displayed on an associated display and the data is suitably received from associated user input devices. Where the printer server system 104 performs the method 700, the prompt is suitably displayed on a display of the user device that generated the print job and the data is suitably received from user input devices of the user device that generated the print job, via the communications network 108.

Regardless of whether a prompt is displayed and/or the print job is analyzed, one or more formatting fixes are applied 710 to the document of the print job next. In certain embodiments, the applied formatting fixes are based on the received data from the prompt. A formatting fix resizes and/or repositions a component of the document, such as a table, text, an image, and so on, and/or modifies attributes of the document, such as font size, margin size, and so, to reduce overall page counts and/or color page counts. Suitably, the formatting fixes including at least one of image fitting, text fitting and table fitting. Image fitting includes identifying one or more images of the document spanning multiple pages and/or extending beyond page margins of the document. Further, image fitting includes scaling and/or repositioning the identified images to fit within page margins. Table fitting includes identifying one or more tables of the document spanning multiple pages and repositioning the identified tables to reduce segmentation. Text fitting includes determining whether the document includes a page sparsely populated with text and resizing fonts and/or adjusting margins of the document to eliminate the page.

After the formatting fixes are applied to the print job, the print job is transferred 712 to a print queue. As noted above, the print job can be intercepted en route to a print queue and/or modified from a print queue. The transferring 712 suitably returns and/or adds the modified print job to the print queue it was originally in and/or destined for. In certain embodiments, the method 700 further includes receiving 714 one more configuration parameters for the application of the formatting fixes, said configuration parameters including at least one of a limit on an extent of an image resize or shift, a limit on an extent of a table shift, a limit on an extent of a margin adjustment and a limit on an extent of a font resize. The configuration parameters can be employed to control aspects of the method 700, previously described.

In view of the foregoing, it is to be appreciated that the print agents described herein provide cost savings to those that implement them. Such savings comes from minimizing wasted print jobs, color print impressions, and total print impressions. Further, the print agents described herein increase user satisfaction and save the users time. Such benefits follow since printed output more frequently matches user intentions, manual formatting of documents is reduced, and reprinting is avoided.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth. Further, as used herein, a processor-based controller includes one or more of a microprocessor, a microcontroller, a graphic processing unit (GPU), an application-specific integrated circuit (ASIC), a field-programmable gate array (FPGA), and the like; a user input device includes one or more of a mouse, a keyboard, a touch screen display, one or more buttons, one or more switches, one or more toggles, and the like; and a display includes one or more of a LCD display, an LED display, a plasma display, a projection display, a touch screen display, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for reducing total and/or color page counts, said system comprising:
   a memory including a print queue;
   one or more processors programmed to:
   receive a print job, said print job including a document formatted according to a page description language (PDL);
   analyze the received print job to determine one or more recommendations as to formatting fixes to apply to the print job;
   display the determined recommendations to a user of the system;
   receive a selection of at least one of the displayed recommendations from the user;
   modify the received print job by applying one or more formatting fixes to the document based on the received selection, the formatting fixes including at least one of image fitting, text fitting and table fitting;
   transfer the modified print job to the print queue; and
   wherein the received print job is received from a print queue, said print queue storing print jobs to be printed, wherein the one or more processors are further programmed to:

analyze the received print job to determine how to apply the formatting fixes to the document to reduce a total page count of the document and a color page count of the document based on a relative importance of reducing total page counts and color page counts.

2. The system according to claim 1, further including:
a printer for printing the print job from print queue.

3. The system according to claim 1, wherein the received print job was destined for the print queue, and wherein the processor is programmed to intercept the print job before reaching the print queue.

4. The system according to claim 1, wherein the formatting fixes include image fitting, said image fitting including:
identifying one or more images of the document spanning multiple pages and/or extending beyond page margins of the document; and
scaling and/or repositioning the identified images to fit within page margins.

5. The system according to claim 1, wherein the formatting fixes include table fitting, said table fitting including:
identifying one or more tables of the document spanning multiple pages; and
repositioning the identified tables to reduce segmentation.

6. The system according to claim 1, wherein the formatting fixes include text fitting, said text fitting including:
determining whether the document includes a page sparsely populated with text; and
resizing fonts and/or adjusting margins of the document to eliminate the page.

7. An information technology (IT) infrastructure comprising:
one or more user devices;
the system according to claim 1, where the print job is received from one of the user devices; and
a printer for printing the print job from the print queue.

8. The IT infrastructure according to claim 7, further including: a print server system, said print server system including the system according to claim 1.

9. A method for reducing total and/or color page counts, said method comprising:
receiving a print job from a print agent or a print queue, said print job including a document formatted according to a page description language (PDL), said print agent generating print jobs, and said print queue storing print jobs to be printed;
analyzing the received print job to determine how to apply one or more formatting fixes to the document to reduce a total page count of the document and a color page count of the document based on the relative importance of reducing total page counts and color page counts;
modifying the received print job by applying the formatting fixes to the document based on the analyzing, the formatting fixes including at least one of image fitting, text fitting and table fitting; and
transferring the modified print job to the print queue.

10. The method according to claim 9, further including:
receiving one more configuration parameters for the application of the formatting fixes, said configuration parameters including at least one of a limit on an extent of an image resize or shift, a limit on an extent of a table shift, a limit on an extent of a margin adjustment and a limit on an extent of a font resize.

11. The method according to claim 9 wherein the receiving includes intercepting the print job before reaching the print queue.

12. The method according to claim 9, further including:
analyzing the received print job to determine the formatting fixes to apply to the document.

13. The method according to claim 9, wherein the formatting fixes include image fitting, said image fitting including:
identifying one or more images of the document spanning multiple pages and/or extending beyond page margins of the document; and
scaling and/or repositioning the identified images to fit within page margins.

14. The method according to claim 9, wherein the formatting fixes include table fitting, said table fitting including:
identifying one or more tables of the document spanning multiple pages; and
repositioning the identified tables to reduce segmentation.

15. The method according to claim 9, wherein the formatting fixes include text fitting, said text fitting including:
determining whether the document includes a page sparsely populated with text; and
resizing fonts and/or adjusting margins of the document to eliminate the page.

16. The method according to claim 9, wherein the PDL is one of PostScript and printer command language (PCL).

17. A system comprising: one or more processors programmed to perform the method according to claim 9.

18. A computer medium carrying software which controls one or more processors to perform the method according to claim 9.

* * * * *